(12) United States Patent
Horii et al.

(10) Patent No.: US 7,058,118 B1
(45) Date of Patent: Jun. 6, 2006

(54) DEMODULATOR

(75) Inventors: Akihiro Horii, Zama (JP); Kenichi Shiraishi, Yokohama (JP)

(73) Assignee: Kabushiki Kaisha Kenwood, Tokyo (JP)

( * ) Notice: Subject to any disclaimer, the term of this patent is extended or adjusted under 35 U.S.C. 154(b) by 0 days.

(21) Appl. No.: 09/831,829

(22) PCT Filed: Nov. 25, 1999

(86) PCT No.: PCT/JP99/06567

§ 371 (c)(1),
(2), (4) Date: May 15, 2001

(87) PCT Pub. No.: WO00/33529

PCT Pub. Date: Jun. 8, 2000

(30) Foreign Application Priority Data

Nov. 27, 1998 (JP) .................... 10-338184

(51) Int. Cl.
*H03B 13/00* (2006.01)
*H04L 27/06* (2006.01)

(52) U.S. Cl. .................. 375/149; 375/324; 375/341
(58) Field of Classification Search ............ 375/346, 375/240.28, 354, 365, 262, 265, 324, 340, 375/341, 144, 145, 148, 149, 150; 714/792, 714/794, 795
See application file for complete search history.

(56) References Cited

U.S. PATENT DOCUMENTS

| 4,462,101 | A | | 7/1984 | Yasuda et al. | |
|---|---|---|---|---|---|
| 6,147,826 | A | * | 11/2000 | Hashimura | .................... 360/53 |

FOREIGN PATENT DOCUMENTS

| EP | 0 827 300 | 3/1998 |
|---|---|---|
| JP | 04-335718 | 11/1992 |
| JP | 05-183448 | 7/1993 |
| JP | 07-254861 | 10/1995 |
| JP | 09-321813 | 12/1997 |

OTHER PUBLICATIONS

A. Hashimoto and H. Katoh, "Development of a Transmission System and an Integrated Receiver for Satellite ISDB", IEEE Transactions on Consumer Electronics, vol. 43, No. 3, pp. 337-343, Aug., 1997.

(Continued)

*Primary Examiner*—Young T. Tse
(74) *Attorney, Agent, or Firm*—Eric J. Robinson; Robinson Intellectual Property Law Office, P.C.

(57) ABSTRACT

A demodulator having an improved reliability of the decoding of a TMCC signal is used for digital broadcasting receivers for receiving digital broadcasting by layered transmission system. A pseudo-pattern generator (8) generates fixed pseudo-data which involves no error with respect to a main signal after a TMCC signal and maintains the convolution relationship, and inserts the pseudo-data between the TMCC signal and the main signal through a selector (6B) and a selector (6), thereby conducting Viterbi decoding.

7 Claims, 7 Drawing Sheets

OTHER PUBLICATIONS

International Search Report.
Notification of Refusal Reason dated Oct. 14, 2004, for JP 338184/1998.
Supplementary European Search Report dated Nov. 25, 2005 for Application No. 99973202.7.

K. Kai et al., *Services and Navigation in Satellite ISDB*, *IEEE,* Dec. 2, 1997, pp. 1-4.
A. Hashimoto et al., *Development of a Transmission System and Integrated Receiver for Satellite ISDB, IEEE,* Jul. 13, 1997, pp. 42-43.

* cited by examiner

PRIOR ART

FIG. 5

| MODULATION TYPE | RATE (3) | S |
|---|---|---|
| BPSK r=1/2 | 000 | 1 |
| QPSK r=1/2 | 001 | 0 |
| QPSK r=2/3 | 010 | 0 |
| QPSK r=3/4 | 011 | 0 |
| QPSK r=5/6 | 100 | 0 |
| QPSK r=7/8 | 101 | 0 |
| TC8PSK r=2/3 | 110 | 0 |

PRIOR ART

FIG. 6 PRIOR ART

DEMODULATOR

TECHNICAL FIELD

The present invention relates to a demodulator used for a digital satellite broadcasting receiver to receive broadcasting adopting a layered transmission system in which modulated waves by a plurality of modulation systems undergo time base multiplexing for transmission.

BACKGROUND ART

In the digital satellite broadcasting, a layered transmission system is adopted in which a plurality of transmission systems with different necessary C/N (ratio of carrier level to noise level) values, for example, 8PSK, QPSK and BPSK, are combined every interval, and are transmitted repeatedly on a frame-by-frame basis.

A digital satellite broadcasting receiver to receive the digital modulated waves by such a layered transmission system enables demodulation by capturing frame synchronization signals from the demodulated base band signals, and from timings of the captured frame synchronization signals, judging the most essential information on transmission of main signals necessary to demodulate the transmitted signals, for example, a modulation system, a position of a TMCC (Transmission and Multiplexing Configuration Control) signal being a transmission multiplexing control signal for representing an error correction system and positions of burst signals.

The TMCC signals, which have undergone convolution encoding continuously, are determined in advance to be of BPSK and have an encoding ratio of the convolution encoding r=1/2. However, since a modulation system and an encoding system (an encoding ratio of convolution encoding) for TS data (hereafter referred to as a main signal or simply as TS) are not known until the TMCC signals are decoded, Viterbi Trellis decoding on the entire frame including TMCC signals and TS data becomes possible only after only TMCC signals are processed by Viterbi decoding and decoded by a TMCC decoder, and then multiplexed configuration of modulated waves, and the modulation system and encoding system for the TS data subsequent to the TMCC signal are read out.

Figure 4:
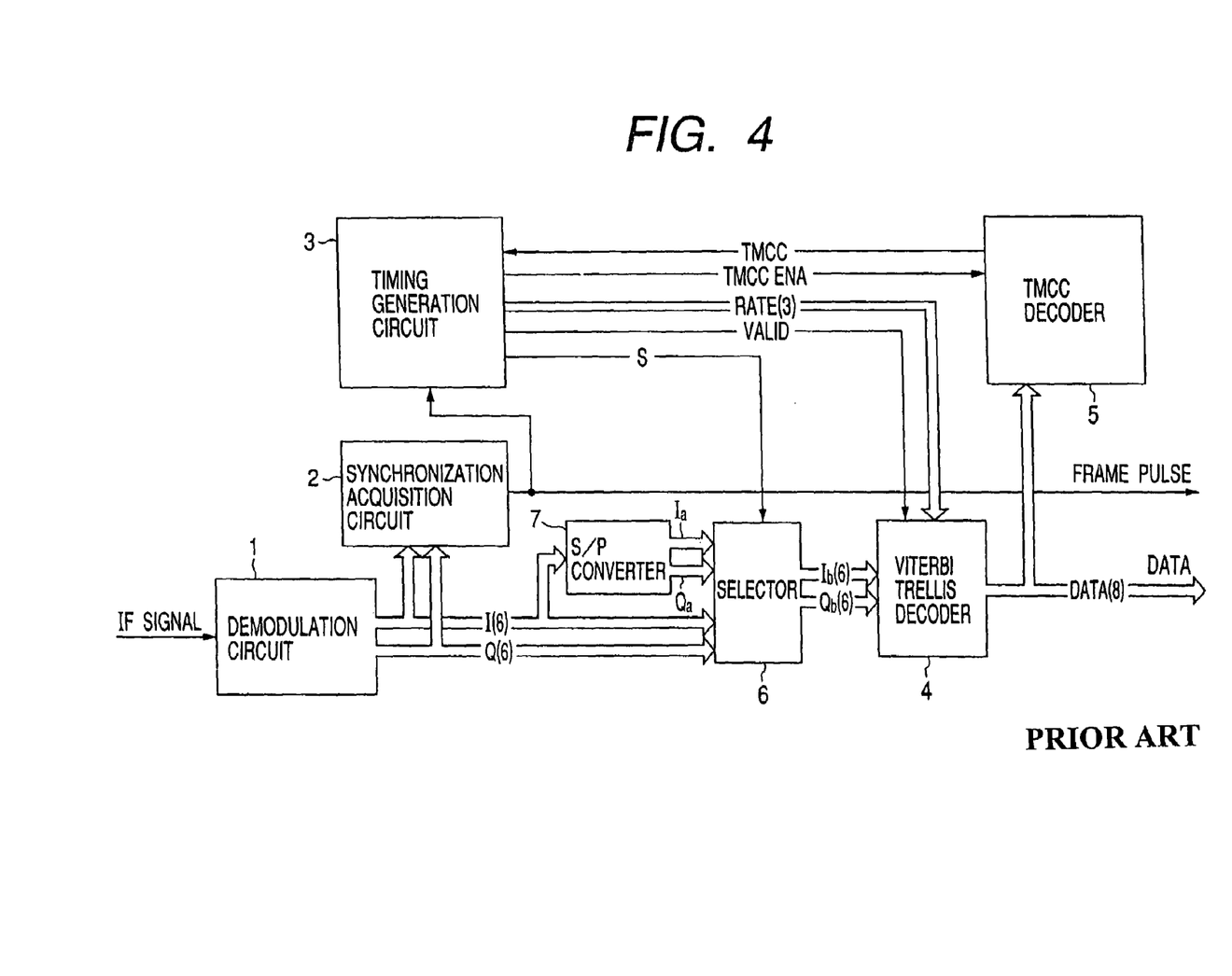
FIG. 4 is a block diagram showing a configuration of a conventional demodulator.

This sort of prior art demodulator is configured as shown in FIG. 4. In FIG. 4, a demodulation circuit 1 receives as its input an intermediate frequency signal which is obtained by converting the frequency of the received digital modulated wave to a predetermined intermediate frequency and sends out base band signals I(6) and Q(6) whose number of quantized bits is 6, for example (hereinafter, they are also expressed as I and Q by omitting the number of bits. In addition, other signals are similarly expressed by omitting the number of bits).

The sent-out base band signals I and Q are inputted to a synchronization acquisition circuit 2 for acquiring the frame synchronization signals, and it will be judged that frames are synchronized when it has been confirmed that frame synchronization signals acquired in the synchronization acquisition circuit 2 are repeatedly received in every constant frame interval so that frame pulses are outputted in every frame period.

The frame pulses are inputted to a timing generation circuit 3 which creates timing signals as well as control signals necessary in circuits in a later stage to send out TMCC enable signals (hereinafter to be described also as TMCCENA), VALID signals 3-bit rate signals and selection signals (hereinafter to be also described simply as S signal) from the timing generation circuit 3.

A TMCC enable signal is a gate signal to reach a higher voltage during the period when the error-corrected TMCC signals are outputted from the Viterbi Trellis decoder 4, and during a period when the TMCC enable signals are to maintain a high voltage, the input gate of the TMCC decoder 5 opens so that the Viterbi-decoded TMCC signals are inputted to the TMCC decoder 5.

The VALID signals are signals that give rise to a lower voltage only for sections of the bust symbol signals (to be also described simply as BS signal) which arrive by transmission with a rate of 4 symbols to be inserted toward the TS data of 203 symbols for making carrier reproduction easy, and for the period while the VALID signals are kept with a lower voltage, the input gate of the Viterbi Trellis decoder 4 is closed and burst signals are removed.

S signals are signals that will be provided with a higher voltage only during the period occupied by TMCC signals. A RATE signal is a signal that has been allocated based on modulation type and encoding rate.

In addition, the TMCC decoder 5 executes predetermined decoding on the TMCC signals to return to the timing generation circuit 3 the TMCC being information such as multiplexed configuration, modulation type of TS data and encoding type, etc. The timing generation circuit 3 will be capable of generating RATE signals based on this TMCC signal.

On the other hand, the base band signal I and Q are provided to the selector 6 as well. Base band signals I, Q, and base band signals Ia and Qa which have undergone parallel conversion on the I signals as an input by an S/P converter 7 to execute serial/parallel conversion thereon are selected by S signal and outputted to the selector 6. The outputs from the selector 6 will be treated as the base band signals Ib and Qb.

The base band signals Ib and Qb are inputted to the Viterbi Trellis decoder 4 while the Viterbi Trellis 4 proceeds with decoding corresponding with the RATE signals being identification signals of modulation type as well as encoding type of the base band signals Ib and Qb in receipt thereof. The decoded data undergo serial/parallel conversion with byte as a unit from the leader of the TMCC signals so as to be outputted to TMCC decoder 5 as well as a subsequent circuit byte by byte.

S signals being selection signals of a selector 6 and RATE signals to control decoding operation of the Viterbi Trellis decoder 4 will be described with reference to FIG. 5 and FIG. 6.

Figure 5:
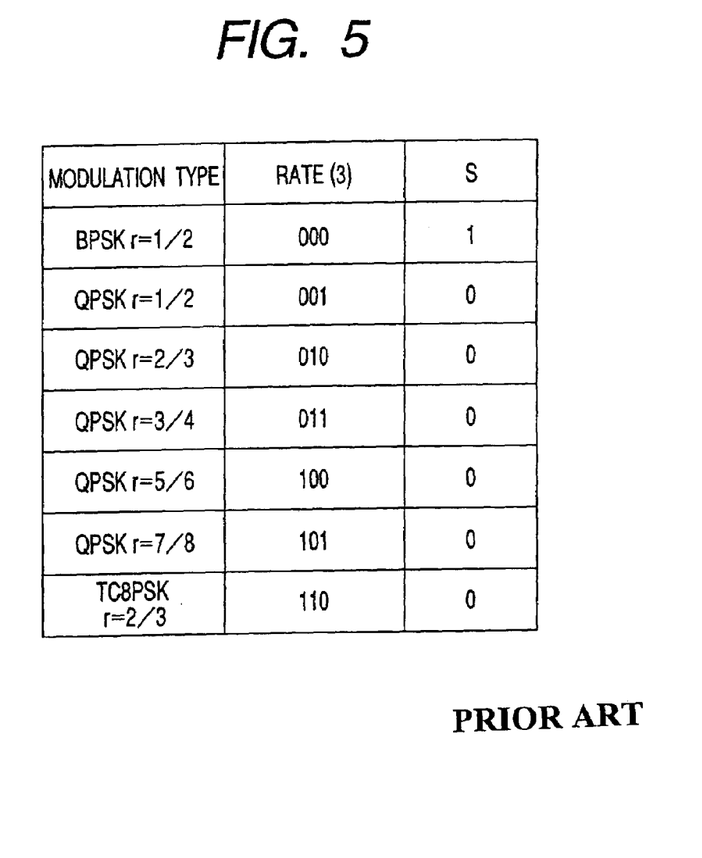
FIG. 5 is a truth table of control signals in a demodulator.

An S signal is a signal to which higher voltage is given for sections under the BPSK, r=1/2 with the base band signals I and Q as shown in FIG. 5. Accordingly, the TMCC signal sections will always give higher voltages. The reason why signals under BPSK, r=1/2 always undergo serial/parallel conversion is that in a convolution encoder at the transmitting party, in case of BPSK, r=1/2, in 2-bit C0 and C1 to be outputted in parallel for a 1-bit input, parallel/serial conversion is executed with C0 as a leader to be sent out on the I axis subject to mapping, and thus it is necessary for the receiving party to proceed with decoding with opposite operation against this.

On the other hand, the RATE signals control decoding operations of the Viterbi Trellis decoder 4. As shown in FIG. 5, modulation types as well as encoding types (decoding types) are shown there. RATE=000 represents BPSK, r=1/2.

In addition, RATE=001 represents QPSK, r=1/2.

However, after undergoing serial/parallel conversion as described above, BPSK, r=1/2 can be treated as QPSK, r=1/2 for Viterbi Trellis decoding, but there is difference that the rate subject to serial/parallel conversion is half compared with QPSK, r=1/2. In addition, the modulation type for RATE=010 to 101 is QPSK, but encoding rates differ in accordance with puncture encoding. In this case, depuncture decoding process corresponding with RATE, that is, an encoding rate is executed inside the Viterbi Trellis decoder 4. In addition, RATE=110 means TC (TC stands for Trellis code) 8PSK, r=2/3, and Trellis decoding is executed.

Figure 6:
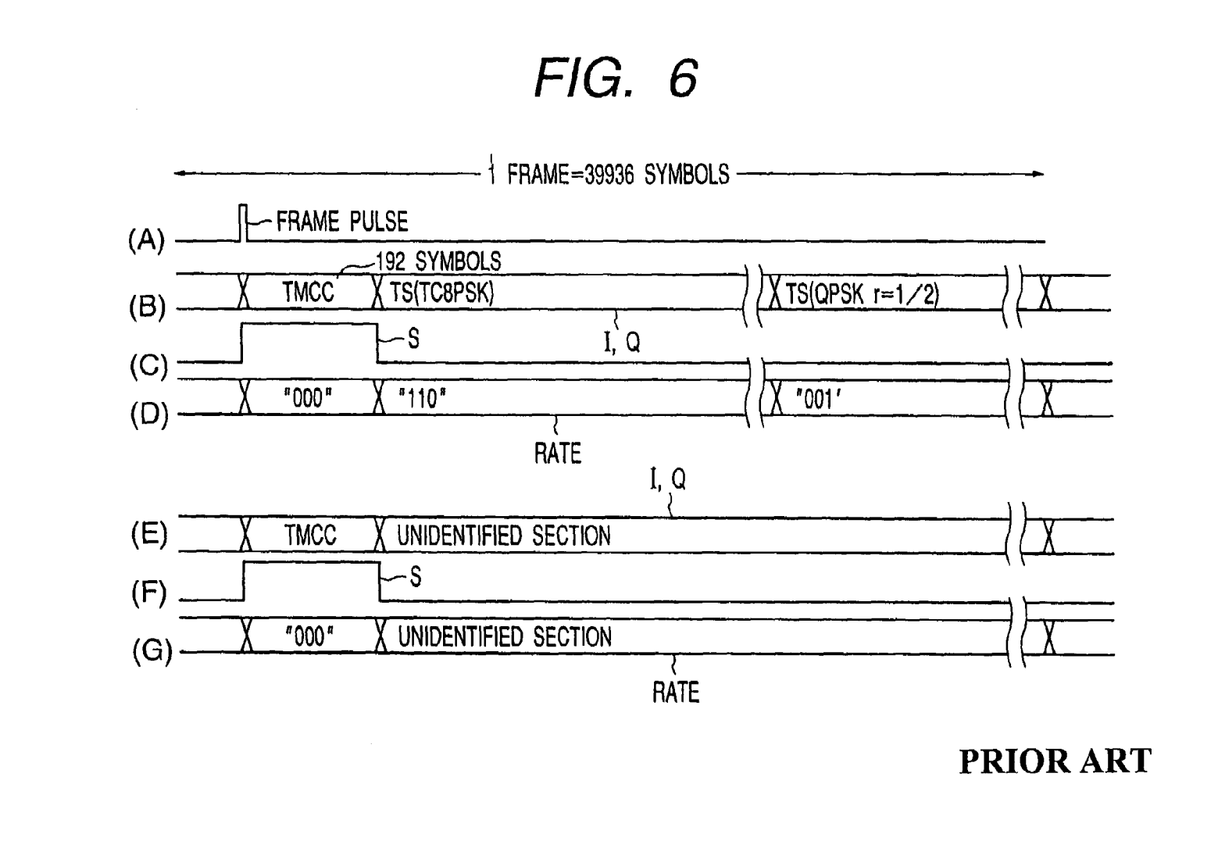

FIG. 6 describes one frame of respective signals in the prior arts shown in FIG. 4. FIG. 6(A) shows a frame pulse, which is outputted from synchronization acquisition circuit 2 in every frame interval subject to fixation of frame synchronization. FIG. 6(B) shows decoded base band signals I and Q, and exemplifies a configuration in which following the TMCC signal main signals of the TC8PSK, and the main signals of QPSK, r=1/2 are multiplexed.

FIG. 6(C) shows the S signals with higher voltage in the portion of BPSK, r=1/2. In the present example, only the TMCC section where transmission takes place under BPSK, r=1/2 is provided with a higher voltage. FIG. 6(D) shows the RATE signal with 000 for the TMCC signal section, 110 for the main signal section of TC8PSK, r=1/2, and 001 for the main signal section of QPSK, r=1/2.

However, modulation type as well as encoding type of the main signal in succession of the TMCC signal will become identifiable and controllable for the first time when the TMCC signal is decoded. Accordingly, before decoding the TMCC signals, it is necessary to execute Viterbi decoding only for the TMCC signal section.

In addition, FIGS. 6(E), 6(F) and 6(G) are timing charts respectively on the base band signals I and Q, S signal and RATE signal which have been demodulated prior to demodulation on TMCC signal. The S signal is provided with a higher voltage while the RATE signal is 000 respectively for the TMCC signal section, but unidentified otherwise.

Figure 7:
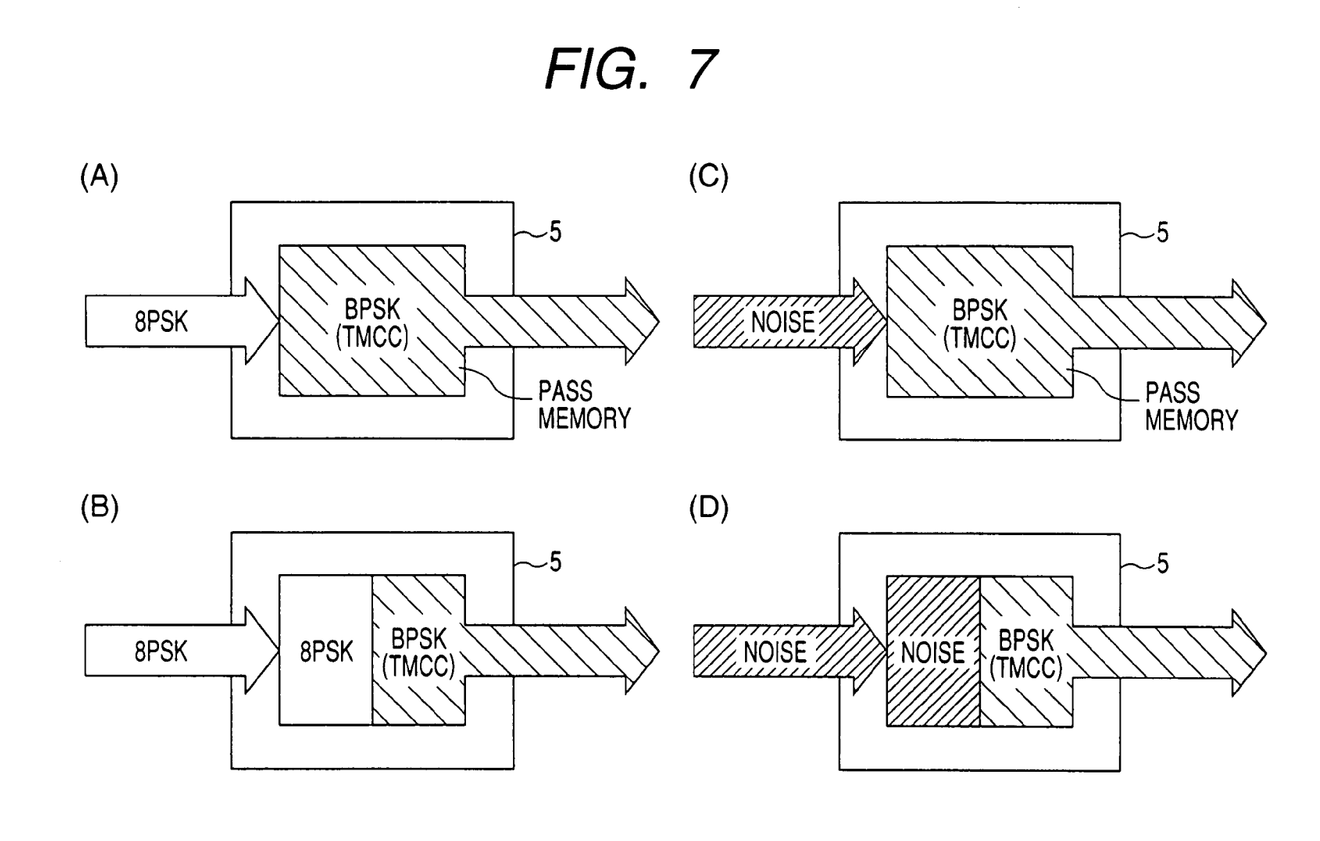

A stream accompanied by the TMCC signals and this unidentified sections are brought into Viterbi decoding, giving rise to problems as follows. FIG. 7 is to show a technical concept of Viterbi decoding. FIG. 7(A) shows the process that 96 symbols of the TMCC signal (after serial/parallel conversion, the TMCC signal of 192 symbols will become equal to the QPSK symbol of 96 symbols) are accumulated in a pass memory and the main signal data of the subsequent TC8PSK are inputted. Currently around 96 symbols are dominant for the length of pass memory, and therefore as shown in FIG. 7(B), when the main signal is inputted, the TMCC signals are gradually decoded to be outputted.

However, in the case where modulation as well as encoding type of the main signals is unidentified, the inputted data are equal to noises, and therefore, as in FIGS. 7(C) and 7(D) noise components are gradually accumulated into the pass memory data for correcting errors to proceed with encoding, making the out-pushed TMCC signal data to become unreliable. In addition, not only the problem taking place prior to decoding of the TMCC signals but also in the case where at the time when TC8PSK is being received as a main signal, reception C/N decreases to go under C/N with which error correction remains effective for TC8PSK, the TC8PSK data are equal to noise, and thus there is a problem that reliability toward decoding on the TMCC signals decreases.

An objective of the present invention is to provide a demodulator having been improved in reliability toward decoding on TMCC signals.

DISCLOSURE OF THE INVENTION

A demodulator of the present invention is a demodulator in a digital broadcasting receiver to receive digital broadcasting adopting layered transmission system, characterized by comprising pseudo-data inserting means to insert a fixed pseudo-data lacking any errors between a TMCC signal and a main signal subsequent to the TMCC signal and maintaining convolution relationship.

According to the demodulator of the present invention, error-free fixed data are inserted between the TMCC signal and the main signals subsequent to the TMCC signal and are brought into Viterbi decoding so that, even in the case where the main signal data are infinite and have resembled noises under a low C/N state, the TMCC signal will become certainly error-correctable, and moreover error rate after Viterbi decoding is improved than in case of decoding BPSK, r=1/2 in series, and reliability is improved.

BRIEF DESCRIPTION OF THE DRAWINGS

FIGS. 2 (A)–(C) are explanatory views showing format conversion of TMCC signals in a demodulator related to an embodiment of the present invention;

FIGS. 3 (A)–(H) is a timing chart provided for explanation on operation of a demodulator related to an embodiment of the present invention;

FIGS. 6 (A)–(B) is a timing chart provided for explanation on operation of a prior art demodulator; and FIGS. 7 (A)–(D) are explanatory views of a technical concept of Viterbi decoding.

BEST MODE FOR CARRYING OUT THE INVENTION

A demodulator related to the present invention will be described by way of an embodiment as follows.

Figure 1:
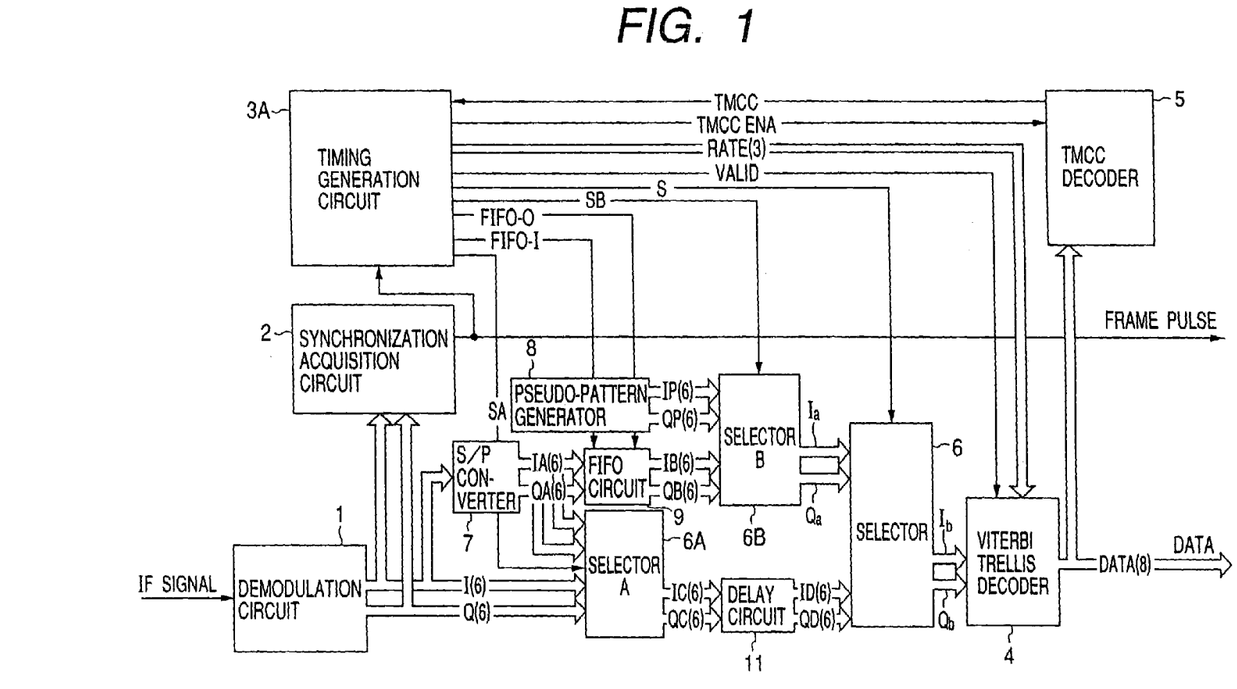
FIG. 1 is a block diagram showing a configuration of a demodulator related to an embodiment of the present invention.

FIG. 1 is a block diagram showing a configuration of a demodulator related to an embodiment of the present invention.

The demodulator related to an embodiment of the present invention newly comprises as shown in FIG. 1 a pseudo-pattern generator 8 to generate pseudo-data IP, QP of pseudo-pattern being related fixed data undergoing QPSK conversion in advance and maintaining convolution relationship and an FIFO circuit 9 being a memory to accumulate TMCC signals of 96 symbols of a half rate of the transmission symbol rate subject to serial/parallel conversion (QPSK conversions) in an S/P converter 7 and to proceed with read out at a doubled transmission symbol rate in addition to a prior art demodulator shown in FIG. 4. In FIG. 1, output data from the S/P converter 7 are expressed by IA and QA.

The demodulator related to an embodiment of the present invention further comprises a selector 6B to multiplex outputs IP and QP from the pseudo-pattern generator 8 and outputs IB and QB from the FIFO circuit 9, a selector 6A to output the outputs from the S/P converter 7 as the base band signals IC and QC for the main signal portion modulated by BPSK, to output the base band signals I and Q as the base band signals IC and QC for the data portion modulated by modulation types other than that, and a delay circuit 11 to delay the base band signals IC and QC by a predetermined time to execute matching between input timing of the output of the selector 6B at the input end of the selector 6 and of the output of the selector 6A.

In addition, instead of the timing generation circuit 3A, a timing circuit 3A is comprised. Beside the outputs same as the outputs from the timing generation circuit 3, the timing generation circuit 3A provides with selection signals for the selector 6A, selection signals SB for the selector 6B, gate signals FIFO-I for writing-in in the FIFO circuit 9 and gate signals FIFO-O for reading-out from the FIFO circuit 9 respectively as additional control signals.

Figure 2:
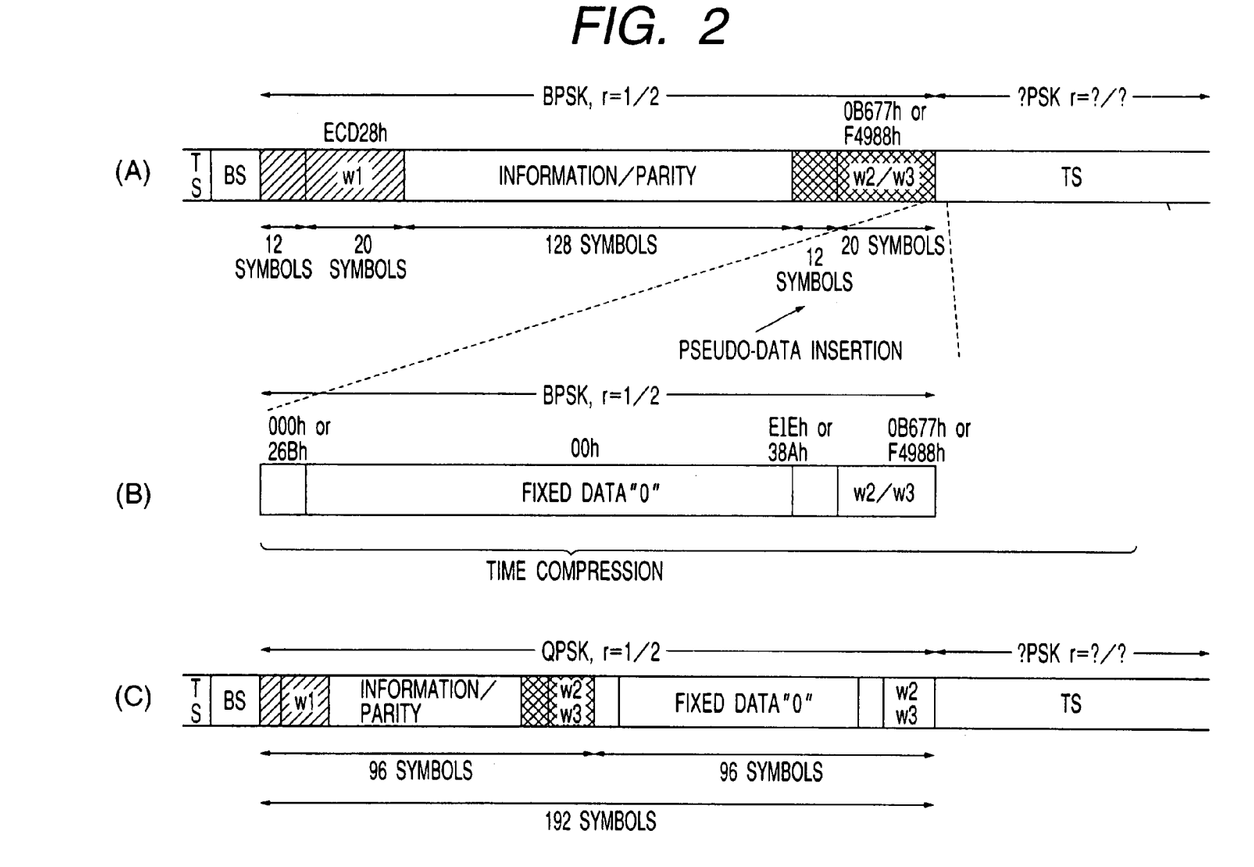

Prior to description on operation of the demodulator related to an embodiment of the present invention, at first format conversion of TMCC signals will be described with reference to FIG. 2.

FIG. 2(A) shows a symbol stream of a TMCC signal section. Subsequent to 4-symbol burst signal (BS signal) inputted for making carrier reproducing acquisition easy, the transmission side convolves the code 1B95h (hereinafter a character h denotes a hexadecimal) with a convolution encoder and undergoes BPSK mapping to generate a stream indicated by inclined lines of 32 symbols to be transmitted. In this stream, the forward 12 symbols are different depending on contents of the preceding TS data thereof, but the rearward 20 symbols will become a fixed signal entitled ECD28h that is usable for frame synchronization.

These rearward 20 symbols are a synchronization word for transmission frame synchronization and referred to as w1. Subsequent to w1, 128 symbols of contents of the TMCC signal are transmitted and thereafter the convolution encoder convolves A340h or 5CBFh to generate a stream of 32 symbols subject to BPSK mapping to be transmitted (a cross-inclined-lined portion). The preceding 12 symbols to this cross-inclined-lined portion are different depending on contents of the TMCC signal, but the rearward 20 symbols in the cross-inclined-lined portion will become a fixed signal entitled 0B677h or F4988h.

Here, reference code 0B677h denotes a synchronization word for identifying the leading frame of the super frame, and is referred to as w2. Reference code F4988 denotes a synchronization word for identifying the second to eighth frames of the super frame, and is referred to as w3 being equal to logic reverse of w2. Accordingly, w2 is used as a superframe identifying signal showing the super frame leader formed by 8 frames. W3 is transmitted in the second to eighth frames in the superframe.

Insertion of the pseudo-data of the present invention is executed between w2/w3 and the subsequent TS data. In the present one embodiment, the pseudo-data will be all set to 0. However, data calculated in advance so as not to destroy convolution relationship in 12 symbols portion shifting from w2/w3 to the fixed data and 12 symbols portion shifting from the fixed data to the TS data will be inserted. These data here will be described as related fixed data.

Next, calculation method on these related fixed data will be described. For this, an encoder with industrial standards of constraint length k=7, and generator polynominal 171 and 133 (Octopal) to be used for convolution encoding and a parallel/serial converter to bring outputs C0 and C2 from this encoder with C0 as a leader into parallel/serial conversion are used.

For example, 0 data are added to all the tails of base data A340Ah or 5CBFh of the related fixed data subsequent to w2/w3 to generate w2/w3 for convolution encoding and parallel/serial conversion so that 000h or 26Bh subsequent to 0B677h or F4988h is generated.

Data hereafter are all 0. Accordingly, 000h or 26Bh will become the leading 12-symbol related fixed data. Base data A340Ah or 5CBFh to generate w2/w3 are likewise added to the rearward related fixed data subsequent to the tail of sufficiently long 0 data for convolution encoding and parallel/serial conversion so that E1Eh or 38Ah prior to 0B677h or F4988h is generated. This will become the rearward related fixed data.

Accordingly, as shown in FIG. 2(B) in an enlarged fashion, the pseudo-data are configured by total of 192 symbols breaking down to [forward related fixed data 000h or 26 Bh (12 symbols)]+[fixed data 0 (148 symbols)]+[rearward related fixed data E1Eh or 38Ah (12 μl=symbol)]+[w2 or w3 (20 symbols)]. There pseudo-data are inserted prior to TS data.

The 192 symbol TMCC signal brought into encoding and modulation under BPSK, r=1/2 will become a stream of 96 symbols with QPSK, r=1/2 as described above after undergoing serial/parallel conversion. Accordingly, if the pseudo-pattern is assumed to be a stream of 192 symbol encoded at BPSK, r=1/2 likewise, subject to serial/parallel conversion, it will be equal to a stream of 96 symbols with QPSK, r=1/2. Accordingly, if decoding takes place not at ordinary decoding rate of the TMCC signals (ordinarily to be 1/2 rate after serial/parallel conversion) but at its doubled rate (transmission symbol rate clock), the TMCC signal (96 symbols)+the pseudo-data (96 symbols) after parallel conversions will be decodable within a predetermined time (time to receive the TMCC signal of 192 symbols).

FIG. 2(C) is an example of having compressed [the TMCC signal]+[the pseudo-data] after serial/parallel conversion to a half time. Since the pseudo-data are signals that do not transmit the transmission paths, it can be remarked that reliability of the data subsequent to the TMCC signal is the highest. Accordingly, the TMCC signals are decodable even if a modulation type of TS data is unidentified or they might be noises, and moreover, there is also an advantage that encoding gain will become larger than with ordinary BPSK, r=1/2.

Figure 3:
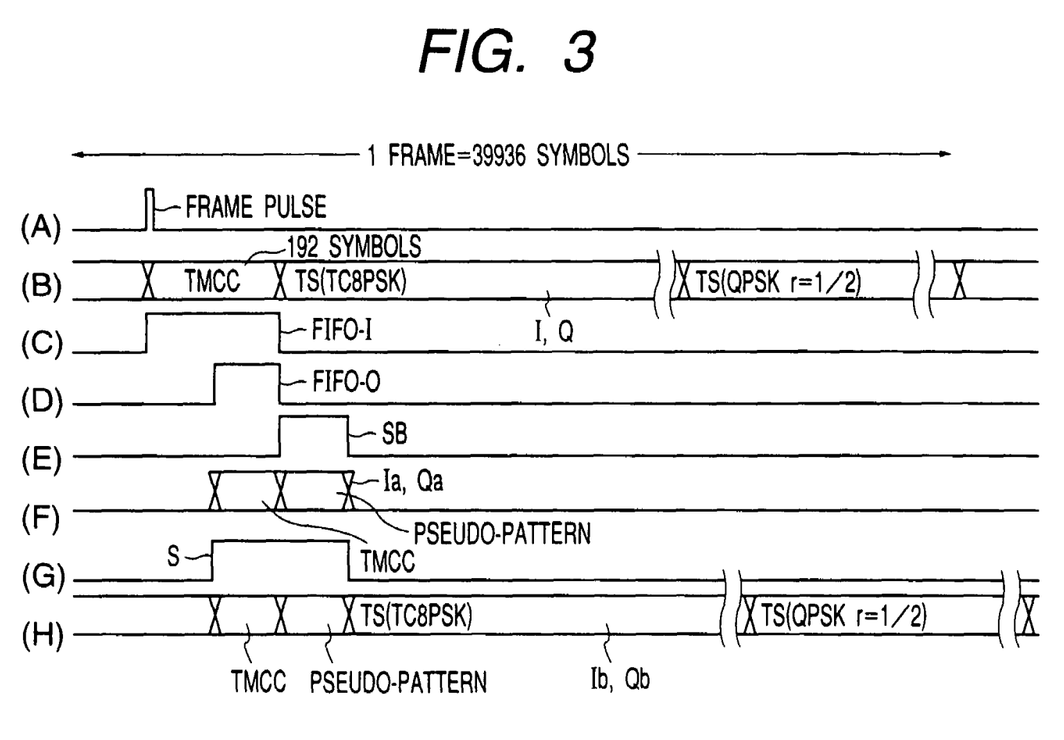

Next, operation of the demodulator related the one embodiment of the present invention shown in FIG. 1 will be described in accordance with timing chart shown in FIG. 3.

FIG. 3(A) shows a frame pulse, which is outputted from a synchronization acquisition circuit 2 every frame interval after frame synchronization is determined as a prior art. FIG. 3(B) shows base band signals I and Q, and the base band signal I is always inputted into the S/P converter 7 to bring into serial/parallel conversion the BPSK signals that are mapped on the I axis and transmitted in.

The 96 symbols of a TMCC signal having undergone parallel conversion with the S/P converter 7 and become QPSK symbols are written into the FIFO circuit 9 at a half rate of the transmission symbol rate at the time of the gate signal FIFO-I being a higher voltage. In addition, the 96 symbols of the TMCC signal having been written into the FIFO circuit 9 are read out from the FIFO circuit 9 at a transmission symbol rate during the period of the gate signal FIFO-O being a higher voltage so as to be sent out to the selector 6B.

Due to the rate of read out from the FIFO circuit being twice the rate of writing into the FIFO circuit 9, if reading out starts at the time point when 48 symbols being approximately half in the 96-QPSK symbol TMCC signal period, circuit sizes of the FIFO circuit 9 can be made to be the smallest. Accordingly, the necessary capacity of the FIFO circuit will be 48 symbols.

As described above, the pseudo-pattern generator 8 generates related fixed data of 96 symbols being QPSK-processed symbols. The rate is a transmission symbol rate and pseudo-pattern generator 8 starts generating the related fixed data from the rising edge of the selection signal SB to continue generating them during the period of higher voltage.

When the selection signal SB is at higher voltage, the selector 6B outputs the signal outputted from the pseudo-pattern generator 8 at the same time, and therefore an output from the selector 6B will be configured by bringing time-compressed TMCC signals and pseudo-patterns into time-division multiplex as shown in FIG. 3(F). In addition, into the selector 6, this base band signals Ia and Qa and the base band signals ID and QD which are produced by delaying the output of and the selector 6A with the delay circuit 11 are inputted and Ia and Qa are selected during the period when the selection signals S are with higher voltage to be outputted, and thereby the outputs Ib and Qb of the selector 6 will be as shown in FIG. 3(H).

At this time, delay in the delay circuit 11 covers 96 symbols. In addition, in the selector 6A, when the selection signals SA are with higher voltage, the outputs IA and QA of the S/P converter 7 are selected to be outputted, but since the selection signals SA, which is set at higher voltage only during the main signal section to be transmitted at BPSK, r=1/2, is always set at lower voltage in the example of FIG. 3, the base band signals I and Q are selected to be outputted.

However, it is known that Viterbi decoding heavily depends on reliability of data equal to pass memory length inputted time-sequentially after the data to be decoded rather than before them due to its correction system. Accordingly, improvement in reliability of data subsequent to the TMCC signal is desired but completely unreliable data will be inputted since the data will be like noises, as describe above, prior to decoding of the TMCC signals and in the low C/N state.

However, in the demodulator related to the one embodiment of the present invention, these problems are solved by inserting convolved pseudo-data maintaining convolved time sequential relationship following the TMCC signal prior to Viterbi decoding of the TMCC signal, and removing them after Viterbi decoding.

The related fixed data length is desired to be not less than the pass memory (96 symbols or more). In the demodulator related to the one embodiment of the present invention, the pseudo-data length has been set to have 96 symbols in QPSK symbols so that the time of [TMCC signal period after insertion of pseudo-data]+[pseudo-data period] is equal to the time of the received TMCC signal period (192 symbol period). This is because of the assumption that a transmission symbol rate clock is used until a signal reach the input portion of the Viterbi decoder, but use of a clock speedier than that enables pseudo-data of not less than 96 symbols.

Moreover, not only immediately after the TMCC signals, but also immediately before that, the pseudo-data as described in the one embodiment of the present invention may be added so that further slight improvement in encoding gain is foreseeable.

INDUSTRIAL APPLICABILITY

As having been described so far, according to the demodulator related to the present invention, error-free fixed data are inserted in the main signals subsequent to the TMCC signal and are brought into Viterbi decoding so that, even in the case where the main signal data are infinite and have resembled noises under a low C/N state, the TMCC signal will become certainly error-correctable, and moreover error rate after Viterbi decoding is improved than in case of decoding BPSK, r=1/2 in series, giving rise to an attainable effect that reliability is improved.

The invention claimed is:

1. A demodulator in a digital broadcasting receiver for receiving a digital broadcast by layered transmission system, said demodulator comprising:
  pseudo-data inserting means for inserting pseudo-data for decoding a transmission and multiplexing configuration control (TMCC) signal before and/or after said TMCC signal;
  wherein said pseudo-data inserting means comprises a serial/parallel converter for serial/parallel converting a demodulated base band signal, a pseudo-data generator for generating said pseudo-data, and a selector for selecting output data of said serial/parallel converter and said pseudo-data outputted from said pseudo-data generator,
  wherein said pseudo-data at least includes related fixed data maintaining a convoluted time sequential relationship.

2. The demodulator according to claim 1, wherein said decoding is Viterbi decoding.

3. The demodulator according to claim 1, further comprising:
  an accumulator to which said output data of said serial/parallel converter are written at a half of a transmission rate and from which the written data are read out at the same rate as said transmission rate to be outputted to said selector.

4. A demodulator in a digital broadcasting receiver for receiving a digital broadcast by layered transmission system, said demodulator comprising:
  pseudo-data inserting means for inserting pseudo-data for decoding a transmission and multiplexing configuration control (TMCC) signal before and/or after said TMCC signal;
  wherein said pseudo-data inserting means comprises a serial/parallel converter for serial/parallel converting a demodulated base band signal, a pseudo-data generator for generating said pseudo-data, and a selector for selecting output data of said serial/Parallel converter and said pseudo-data outputted from said pseudo-data generator,
  wherein said pseudo-data includes fixed data and a synchronization word for frame identification.

5. The demodulator according to claim 4, wherein said decoding is Viterbi decoding.

6. The demodulator according to claim 4, further comprising:
  an accumulator to which said output data of said serial/parallel converter are written at a half of a transmission rate and from which the written data are read out at the same rate as said transmission rate to be outputted to said selector.

7. A method of demodulation for use in a digital broadcasting receiver for receiving a digital broadcast by layered transmission system, said method comprising the step of inserting pseudo-data for decoding a transmission and multiplexing configuration control (TMCC) signal before and/or after said TMCC signal, wherein said inserting step comprises the steps of serial/parallel converting a base band signal demodulated by a demodulation step, generating said pseudo-data, and selecting output data of said serial/parallel converting step and said pseudo-data outputted from said pseudo-data generating step, wherein said pseudo-data at least includes related fixed data maintaining a convoluted time sequential relationship.

* * * * *